T. W. GRIFFIN.
Connecting-Links.

No. 196,293. Patented Oct. 23, 1877.

WITNESSES:
Herm Lauten
Story B. Ladd

Thomas W. Griffin, INVENTOR:
By Paine & Grafton,
Attorneys.

UNITED STATES PATENT OFFICE.

THOMAS W. GRIFFIN, OF GARRETSON'S LANDING, ARKANSAS.

IMPROVEMENT IN CONNECTING-LINKS.

Specification forming part of Letters Patent No. 196,293, dated October 23, 1877; application filed September 7, 1877.

*To all whom it may concern:*

Be it known that I, THOMAS W. GRIFFIN, of Garretson's Landing, in the county of Jefferson and State of Arkansas, have invented certain new and useful Improvements in Connecting-Links; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to furnish an improved link or ring for connecting chains, and for other purposes for which similar links are used, which shall be easy to attach or unfasten, at the same time impossible for it to unfasten accidentally, and which shall be almost as strong on the broken side as on the other; and my invention, which consists of the connecting-link herein described, will be fully understood from the following description and claim.

Figure 1:
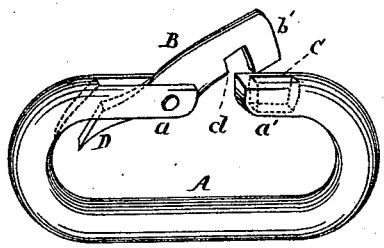
Figure 2:
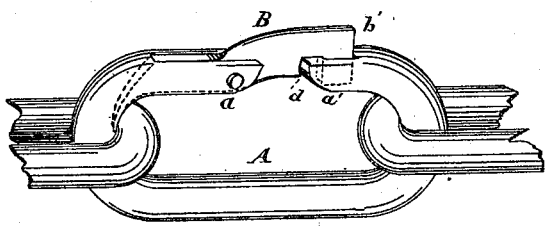

Figure 1 is a perspective view of the link when opened ready for attachment; and Fig. 2, a view of the same coupled with the links of a chain, ready for use.

A is a link, made with an open side between the end $a$ $a'$. The end $a$ of the link has a recess to receive the shank of the hook B, which is pivoted in the recess to the sides of the link. The shank of the hook B extends below the pivot, and the extension D is recessed in the inside of the link when the link is closed. The other end of the link, $a'$, has a mortise, C, to receive the end $b'$ of the hook B. The hook B is constructed preferably with the projecting angle $d$ between the end $b'$ and the pivot of the hook, so that when the link is closed and the end $b'$ of the hook is in the mortise C the inner edge of the broken side of the link will present a continuous surface.

When the link is coupled with a chain the extension D prevents it from unfastening, as the link of the chain bears against it.

I am aware that the device herein shown for preventing the link from unfastening is not new, and also that links with a portion of one side hinged so as to be opened for coupling or uncoupling have been in use before, and I do not claim them as my invention; but with this improved link the end $b'$ of the hook B hooks into the mortise C, so that the broken side of the link is very much stronger than before.

I claim as my invention and desire to secure by Letters Patent—

The improved connecting-link herein described, consisting of the combination of the link A, having mortise C, and the pivoted hook B, having extension D and hook end $b'$, all as described, and for the purpose set forth.

In testimony that I claim the foregoing as my own I affix my signature in presence of two witnesses.

THOMAS W. GRIFFIN.

Witnesses:
J. F. NICHOLSON,
B. F. O'KELLY.